Windle, Gillott & Morris.
Pen Holder
Nº 648. Patented Mar. 21, 1838.
Sheet 1. 2 Sheets.
FIG. 1
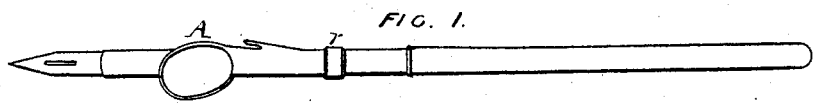
FIG. 2
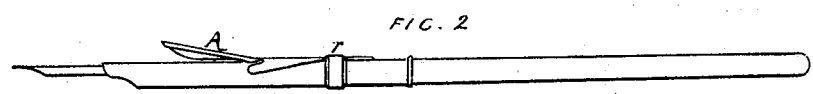
FIG. 3
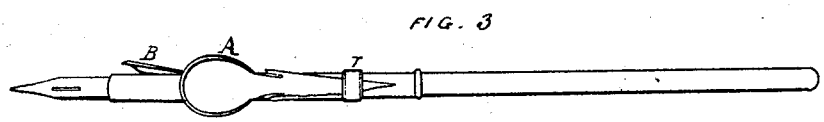
FIG. 4
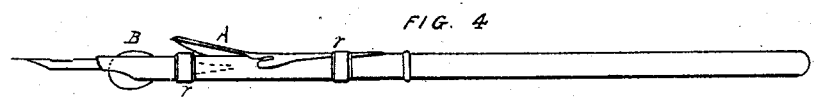
FIG. 5
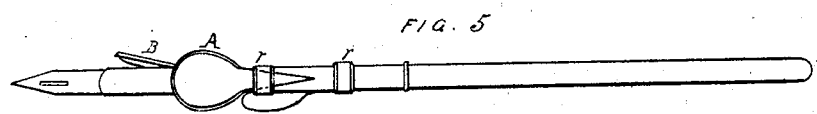
FIG. 6
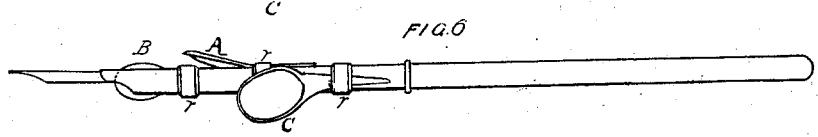
FIG. 7
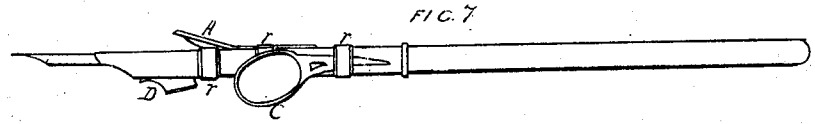
FIG. 17
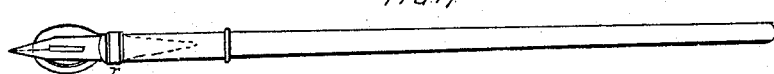
FIG. 18
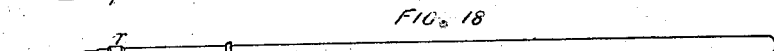
FIG. 14
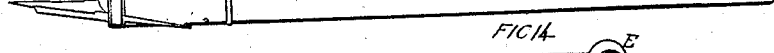
FIG. 19
FIG. 9
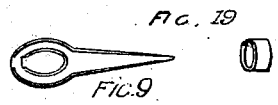
FIG. 15
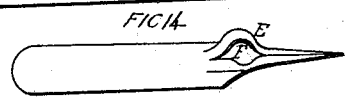
FIG. 10
FIG. 16
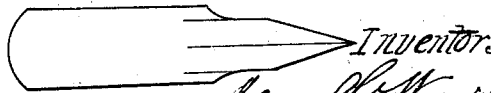
Witnesses.
Jos Taylor
James M Curby
Clerk in the Consulate
U S London
Inventors:
Henry Windle
Jos Gillott
Stephen Morris Sheet 2. 2 Sheets.
Windle, Gillott & Morris.
Pen Holder.
Nº 648.    Patented Mar. 21, 1838.
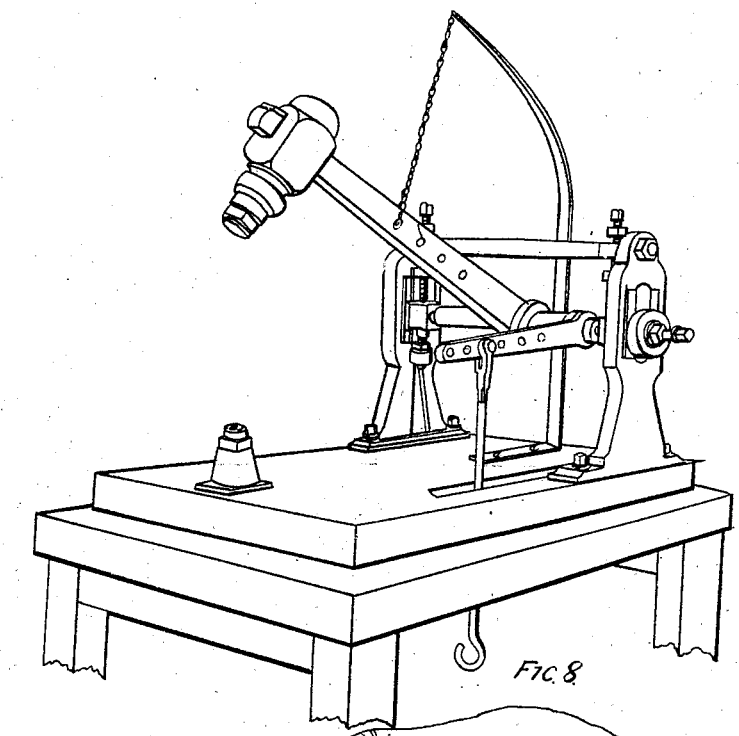
FIG. 11.
FIG. 8.
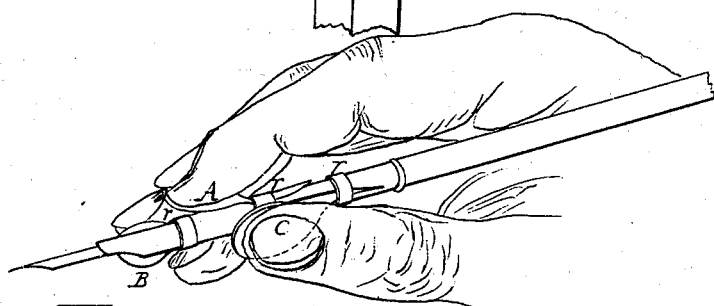
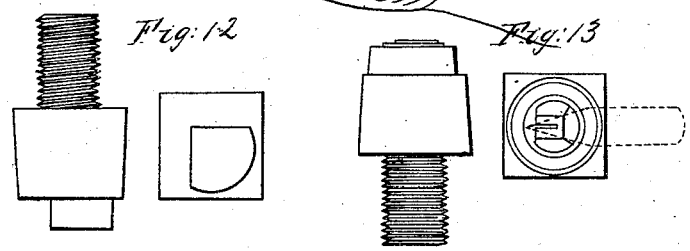
Fig. 12.    Fig. 13.
Witnesses:    Inventors:

UNITED STATES PATENT OFFICE.

HENRY C. WINDLE, OF WALSALL, AND JOSEPH GILLOTT AND STEPHEN MORRIS, OF BIRMINGHAM, ENGLAND.

MODE OF MAKING METALLIC PENS OR INSTRUMENTS FOR WRITING.

Specification of Letters Patent No. 648, dated March 21, 1838; Antedated September 21, 1837.

*To all whom it may concern:*

Be it known that we, HENRY CHRISTOPHER WINDLE, merchant, of Walsall, in the county of Stafford, and JOSEPH GILLOTT, metallic-pen manufacturer, and STEPHEN MORRIS, artisan, of Birmingham, in the county of Warwick, England, have invented improved means of giving elasticity, freedom of action, and durability to certain parts of pens or instruments used in writing, as also of obtaining a supply and flow of ink to the same, of which the following is a description.

We do hereby declare the nature of our said invention to consist, first, in certain adjustable elastic plates applied to that part of the pen or instrument for writing which is held by the fingers and thumb and which plates we therefore call finger and thumb plates whereby the most rigid pen holder or handle part of a pen becomes elastic to the touch while an increased freedom of action is thereby given to the points of the pen; secondly, in stamping that part of the blank out of which it is intended to form the nibs of the pen in such manner as to leave a thick point to each nib and a thick ridge up each side of the slit but preserving the thinness and elasticity of every other part of the nibs and leaving a durable thickness of metal to bear the work of the pen at the points and slit; thirdly, in forming an arch in each nib of the pen, an arch proper in the left nib or nib on the thumb side of the pen and an inverted arch in the right or other nib, the effect of which is to prevent the increased labor which is usually thrown upon the right nib by the inclination which most persons give to the hand in writing and which soon wears the right nib to a sharp point, which then is apt to cut the paper and impede the writing. By the proposed arched nibs and which we call compensating nibs this is avoided, the ordinary pressure on these nibs in writing having the constant effect of withdrawing the right nib from the extra work and protruding the left nib to take an equal share with it for it will be evident that the ends of the inverted arch will approximate while the ends of the arch proper will extend by the same downward pressure on the paper. This equalizing the wear of both nibs of course renders the pen more durable while a great additional freedom of action is given to the nibs by withdrawing the obstruction usually occasioned by the extra pressure of the right nib on the paper, and, fourthly, in a feeder or receptacle for ink so placed that the action of the nibs in writing is constantly agitating the ink and thus promoting its easy and continuous flow downward toward the points of the nibs; and we do hereby describe the manner in which our said invention is to be performed by the following statement thereof, reference being had to the drawing annexed and to the figures and letters marked thereon that is to say

*Description of the drawing.*—Figure 1, is a view of the back of a pen, the part marked A and colored pink being one of our new elastic finger plates. *r* is a ring or sliding ferrule by means of which the finger plate may be brought nearer to or farther from the point of the pen to suit the hand of the writer. This figure represents a fore finger plate made of thin elastic metal and may by means of the ferrule or ring *r* be brought to any position around the pen. Fig. 2, is side view of the same plate. Fig. 3, is a pen furnished with two plates a fore finger plate A and a middle finger plate B. Fig. 4 is a side view of the same pen. Fig. 5 is a view of a pen furnished with three plates—a fore finger plate A, a middle finger plate B, and a thumb plate C—and Fig. 6 is a side view of the same pen and plates. As in some cases persons write with the pen resting on the first joint of the middle finger a plate which we call a saddle plate, shown at D, Fig. 7, is provided for such writers and prevents the aching pain often experienced in the said joint from long writing with ordinary pens. Fig. 8 is a view of a set of fingers and a thumb placed on their respective plates. Fig. 9 is an enlarged view of one of our said pens the nibs of which have been stamped as aforesaid, so as to leave a greater thickness of metal at the points of the nibs and by the sides of the slit, the apertures, slits and side cuts being made afterward in the usual manner. Fig. 10 is the same pen of the usual size. Fig. 11, is the stamping apparatus in which that part of the blank which is to form the nibs is stamped. Fig. 12 is the upper die quite plane and flat and Fig. 13 the lower die containing the cavity or recess which allows the parts required to be thicker to remain of the thickness of the original blank while the sides are reduced by stamping to the necessary thickness. The importance of allowing the points of the nibs to remain thicker than the other parts has long been acknowledged and various attempts by filing and otherwise have been made to accomplish this object, but stamping has never been resorted to before and has a decided advantage over other plans inasmuch as it compresses and renders more compact the thin metal of the nibs while it leaves the thick parts softer and more yielding. Fig. 14 is an enlarged view of one of our double arched or compensating nibbed pens, the blank of which it will be found must be originally cut in the shape shown at Fig. 15. E is what we call the arch proper of the left nib and F what we call the inverted arch of the right nib. Fig. 16, is a back view of one of these pens of the usual size. Fig. 17, represents a pen with one of what we call our new channel pen feeders attached to it by means of a slide ring in the same manner as the finger and thumb plates before described are attached and made adjustable. The nibs it will be seen by this figure lie just over and project beyond the front edge of the feeder, which has a small notch or space cut out to receive them. The pen with its feeder being dipped in an ink bottle of ink in the ordinary way the circular channel of the feeder becomes filled with ink and as the nibs of the pen move in the act of writing over the front edge of that channel they keep continually drawing the ink down toward the point of the pen and feeding the instrument with ink as fast it is required without surcharging it at any one time. Fig. 18 is a side view of Fig. 17, and Fig. 19 is a separate view of our new channel pen feeder.

Now whereas we claim as our invention—

1. The elastic and adjustable finger and thumb plates hereinbefore described whether applied to penholders or pens or other such instruments for writing.

2. The introduction of the double arch one in each nib of the pen in manner and for the purpose hereinbefore also described.

3. The new channel pen feeder made separate from the pen and attached thereto when in use by means of a slide ring for supplying ink to the point of the pen also hereinbefore described.

And we do hereby declare this to be our specification of the same invention.

In witness whereof we, the said HENRY CHRISTOPHER WINDLE, JOSEPH GILLOTT, and STEPHEN MORRIS, have hereunto set our hands the eleventh day of May, one thousand eight hundred and thirty seven.

HENRY C. WINDLE.
JOS. GILLOTT.
STEPHEN MORRIS.

Witnesses:
JAMES McCURLEY,
WM. ELLIOTT.